(12) United States Patent
Levy

(10) Patent No.: US 7,784,838 B2
(45) Date of Patent: Aug. 31, 2010

(54) HIGH PRESSURE ENERGIZABLE TUBE CONNECTOR FOR A WELL

(75) Inventor: David Levy, Broussard, LA (US)

(73) Assignee: Petro Technologies, Inc., Broussard, LA (US)

(*) Notice: Subject to any disclaimer, the term of this patent is extended or adjusted under 35 U.S.C. 154(b) by 537 days.

(21) Appl. No.: 11/766,541

(22) Filed: Jun. 21, 2007

(65) Prior Publication Data

US 2008/0315582 A1 Dec. 25, 2008

(51) Int. Cl.
*F16L 19/06* (2006.01)
(52) U.S. Cl. .................... 285/342; 285/242; 285/245; 285/256; 285/353
(58) Field of Classification Search ............ 285/242, 285/245, 247, 256, 342, 353, 356–357, 384
See application file for complete search history.

(56) References Cited

U.S. PATENT DOCUMENTS 4,093,550 A * 6/1978 Stahl et al. ............... 210/198.2

6,851,728 B2 * 2/2005 Minami ..................... 285/339

* cited by examiner

*Primary Examiner*—Aaron Dunwoody
*Assistant Examiner*—Fannie Kee
(74) *Attorney, Agent, or Firm*—Buskop Law Group, PC; Wendy Buskop

(57) ABSTRACT

A high pressure energizable tube connector for a well comprising a tube; a first connector assembly comprising: a female profile disposed over the tube and a first ferrule disposed over the tube adjacent the female profile; a second connector assembly comprising: an inverted jam nut disposed over the tube and a second ferrule disposed over the tube adjacent the inverted jam nut, wherein the second ferrule extends along the tube in a direction opposite the first ferrule; a nipple comprising a test port, wherein the nipple is disposed over the tube between the first ferrule and the second ferrule; a primary seal formed by compressing the first ferrule into the female profile using a pressure from the test port; and a secondary seal formed by compressing the second ferrule into the inverted jam nut using the pressure from the test port.

15 Claims, 4 Drawing Sheets

HIGH PRESSURE ENERGIZABLE TUBE CONNECTOR FOR A WELL

FIELD

The present embodiments relate to a high pressure energizable tube connector for a well and a method of use.

BACKGROUND

A need exists for a high pressure energizable tube connector having multiple seals that can be formed and set using a single pressure source.

A further need exists for a high pressure energizable tube connector having seals that can maintain their integrity and withstand high pressures greater than comparable seals formed by mechanical tightening.

A need also exists for a high pressure energizable tube connector having multiple seals positioned in a manner allowing the seals to be quickly and simultaneously formed and set without weakening any of the seals.

A need exists for an energizable tube connector that can incorporate an adjustable engagement that can relieve slack in a tube after forming and setting multiple seals.

The present embodiments meet these needs.

BRIEF DESCRIPTION OF THE DRAWINGS

The detailed description will be better understood in conjunction with the accompanying drawings as follows:

FIG. 3 shows the tube 2, the inverted jam nut 12, the first nipple 6, the second threaded engagement 30, the test port 8, the second front ferrule 18, the second rear ferrule 20, the secondary seal 36, the third seal 26, the second nipple 10, the adjustable threaded engagement 32, the second seal 24, the first seal 22, the female profile 4, the first threaded engagement 28, the first front ferrule 14, the first rear ferrule 16, and the primary seal 34.

Figure 1:
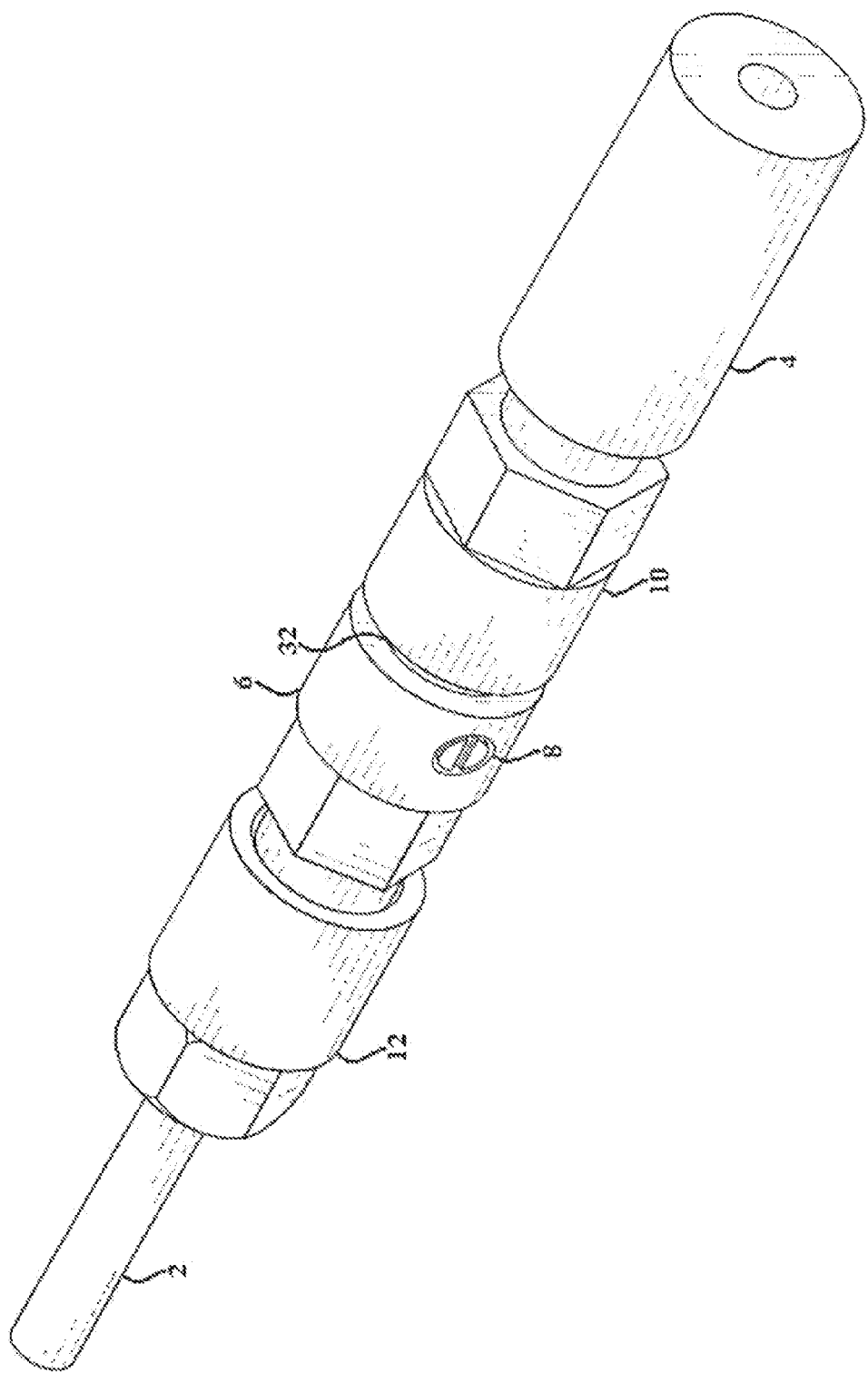
FIG. 1 depicts a perspective view of an embodiment of the present high pressure energizable connector.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a high pressure energizable tube connector for a well, such as an oil well or a natural gas well.

The present high pressure energizable tube connector advantageously provides superior seals over existing connectors through use of deformable ferrules which are compressed between the connector and a tube by the application of a pressure through a test port in the connector. The pressure-set seals of the present connector can maintain their integrity and withstand far greater pressures than conventional seals formed through mechanical tightening or compression, thereby preventing environmental contamination, equipment damage, costly maintenance cycles, and injury that can be caused by failed seals.

The high pressure capabilities of the present connector further allow the present connector to be used for a variety of subsea applications, and similar operations where great pressures and stresses are placed on the connector seals, and where failure of a seal can cause potentially catastrophic environmental hazards and damage to equipment.

The present high pressure energizable tube connector also incorporates an advantageous arrangement, wherein ferrules for creating both an upstream and a downstream seal are faced in opposition, allowing both seals to be simultaneously set by the application of a single pressure through a test port, saving time and labor costs. This opposite facing seal arrangement allows the present tube connector to be installed and utilized more rapidly than other connectors that require individual seals to be individually compressed or tightened to energize the seals.

Additionally, the arrangement of the present connector prevents harm to the integrity of one seal while another is formed. Manual compression, tightening of threads, or the application of a pressure to energize a single seal can adversely affect an adjacent seal that has already been energized. In contrast, the opposing arrangement of the seals of the present connector allows an upstream and downstream seal to be energized simultaneously, and also prevents the applied pressure from de-energizing either of the seals. This feature can prevent damage or injury caused by unknowingly de-energizing a seal during the setting of an adjacent seal.

Further, in an embodiment, the present connector can incorporate the use of an adjustable threaded engagement between two nipple assemblies. After setting the upstream and downstream seals using a pressure, the adjustable threaded engagement can be tightened or loosened as needed to relieve slack in a tube, reducing the risk of tube failure or damage and relieving strain on the tube and the connector.

The present high pressure energizable tube connector can include a tube, such as a 1-4 inch 0.049 tube, engaged by the connector. The tube can be any kind of pipe, tubular, or other hollow tube designed to permit the flow of one or more fluids or semi-solids. The tube can have an outer diameter ranging from about 1/16 inches to about 12 inches, though larger and smaller diameters are contemplated, depending on the material and purpose of the tube.

The tube can be made from plastic, metal, such as a steel or carbon steel alloy, or any other material able to sustain up to 50,000 psi or more without deforming. The ends of the tube can be coned or provided with another shape to facilitate the flow of fluids or connection with adjacent tubes or connectors.

The connector has a first connector assembly, which can be disposed at the upstream end of the tube. The first connector assembly includes a female profile, such as a ¼ inch female profile made by PetroTechnologies, Inc., of Broussard, La., part number 120M972A, disposed over the tube, and a first ferrule disposed over the tube adjacent the female profile. It is contemplated that the first ferrule is slightly downstream from the female profile, so that a pressure applied from the center of the connector can deform the first ferrule into the female profile, forming a seal.

The female profile can engage a second tube, a pressurizable part, such as a blowout preventer, a christmas tree, one or more ram-type apparatuses, or other similar apparatuses. It is contemplated that the first ferrule can be crimped into the female profile, the tube, or combinations thereof to prevent unintended rotation or loosening of the female profile.

The high pressure connector further has a second connector assembly, which can be disposed at the downstream end of the tube. The second connector assembly includes an inverted jam nut, such as a ¼ inch inverted jam nut made by Petro-Technologies, Inc, part number 120M174G, disposed over the tube, and a second ferrule disposed over the tube adjacent the inverted jam nut. It is contemplated that the second ferrule is slightly upstream from the inverted jam nut, so that a pressure applied from the center of the connector can deform the second ferrule into the inverted jam nut, forming a seal. The second ferrule extends along the tube in a direction opposite the first ferrule, such that the first ferrule and the second ferrule are faced in opposition. The inverted jam nut can be any kind of nut or connector that can be disposed around the tube and engage adjacent connectors.

It is contemplated that the second ferrule can be crimped into the inverted jam nut, the tube, or combinations thereof to prevent unintended rotation or loosening of the inverted jam nut.

The first and second ferrules can be made from a deformable material, such as metal or plastic, which deforms upon compression by a pressure. It is contemplated that each ferrule can include a separate front ferrule, such as a ¼ inch front ferrule made by PetroTechnologies, Inc, part number 120M006A, and rear ferrule, such as a ¼ inch rear ferrule made by PetroTechnologies, Inc., part number 120M005A. Other kinds of ferrules, including those made by Swagelok™ or Parker™, can also be used.

The female profile and inverted jam nut can be made from any material, including a steel or carbon steel alloy, that can withstand a pressure up to about 50,000 psi or more without deforming. The dimensions of the female profile and inverted jam nut can vary depending on the size and purpose of the tube.

The present connector further includes a nipple, such as a ¼ inch PTCI nipple made by PetroTechnologies, Inc., part number 120M432N, having a test port. The nipple can be any kind of nipple assembly, collar assembly, or connector assembly having at least one test port, and can engage adjacent connectors. The nipple is disposed over the tube between the first and second ferrules, such that a pressure applied through the test port can engage both ferrules simultaneously, deforming the ferrules to form seals.

The nipple, the inverted jam nut, and the female profile can include threadable engagements, such that the nipple can threadably engage both the female profile and the inverted jam nut simultaneously.

The test port can include a threadable engagement for forming a sealing engagement between the tube and a pressurized fluid supply. A pressure can then be used to form a primary seal, a secondary seal, or combinations thereof by deforming each ferrule. The test port can also be used to form a sealing engagement between the tube and a test fluid supply during seal testing. The test port can further be used to form a leak tight seal with a plug when testing is complete. The test port can include a removable and re-installable test port plug.

The test port can include an access hole having a diameter ranging from about ⅟₃₂ inches to about ⅟₁₆ inches.

The present connector includes a primary seal, formed by compressing the first ferrule into the female profile using a pressure from the test port. The primary seal can include a first contact point between the female profile and an outer diameter of the first ferrule and a second contact point between an inner diameter of the first ferrule and the tube.

The present connector further includes a secondary seal, formed by compressing the second ferrule into the inverted jam nut using the pressure from the test port. The secondary seal can include a first contact point between the inverted jam nut and an outer diameter of the second ferrule and a second contact point between an inner diameter of the second ferrule and the tube.

The pressure can be applied by a hydraulic source, or other sources, and can range from about one atm to about 50,000 psi. Larger pressures are contemplated for use when using tubes and materials designed to withstand pressures greater than 50,000 psi, such as those adapted for sustaining pressures ranging from about 50,000 psi to about 100,000 psi.

In an embodiment, the nipple can include an inverted jam nut seal between the nipple and the inverted jam nut, a female profile seal between the nipple and the female profile, or combinations thereof. The inverted jam nut seal and the female profile seal can be O-rings, such as #013 O-rings made from Viton®, manufactured by DuPont.

In a additional embodiment, the present high pressure energizable tube connector can include a second nipple, such as a ¼ inch PCTI2 nipple made by PetroTechnologies, Inc., part number 120M974A. The second nipple disposed over the tube between the first ferrule and the first nipple. The second nipple can be any kind of nipple assembly, collar assembly, or connector able to engage adjacent connectors. The second nipple can be adjustably and threadably engaged with the first nipple. The second nipple can also threadably engage the female profile.

In this embodiment, the second nipple can include a female profile seal between the second nipple and the female profile, which can be a size 10 O-ring made from Viton®. The first nipple can include an inverted jam nut seal between the first nipple and the inverted jam nut, a second nipple seal between the first nipple and the second nipple, or combinations thereof, which can be O-rings.

The adjustable and threadable engagement between the first nipple and the second nipple can be tightened or loosened after applying a pressure to set the primary seal and the secondary seal to compensate for slack in the tube.

The present embodiments also relate to a method for making a high pressure connection for a well using a connector.

The present method includes the step of sliding an inverted jam nut onto a downstream end of a tube, and sliding a second ferrule into the tube adjacent the inverted jam nut.

The present method further includes sliding a nipple having a test port onto the tube. The test port can include a test port plug.

A first ferrule can then be slid into the tube adjacent the nipple. The upstream end of the tube can then be inserted into a female profile, such that the first ferrule is adjacent the female profile.

The present method continues by threadably engaging the nipple into the female profile while maintaining the first ferrule between the female profile and the nipple.

The present method further includes threadably engaging the inverted jam nut into the nipple while maintaining the second ferrule between the inverted jam nut and the nipple.

The test port plug is then removed, and a pressure generating device, such as a test pump or a hydraulic pump, is connected to the test port. The connection with the test port can be a threaded engagement.

The present method then continues with the step of applying a pressure, such as a hydraulic pressure, from the pressure generating device through the test port, thereby compressing the second ferrule, deforming the second ferrule into the inverted jam nut while deforming the second ferrule into the tube, forming a secondary seal. The pressure also simultaneously compresses the first ferrule, deforming the first ferrule into the nipple while deforming the first ferrule into the tube, forming a primary seal.

The integrity of the primary seal and the secondary seal can then be evaluated. The evaluation of the integrity can utilize a test fluid such as a gas, such as nitrogen, helium, or another gas, water, a hydraulic fluid, or combinations thereof.

Next, pressure is bled, which can be done by utilizing the test port, one or more valves, or combinations thereof.

The test port plug can then be reinstalled into the test port, and the connector can be run into a well.

An alternate method contemplates making a high pressure connection for a well using a connector having a second nipple that adjustably and threadably engages a first nipple.

This alternate embodiment includes the steps of sliding an inverted jam nut onto a downstream end of a tube, sliding a second ferrule into the tube adjacent the inverted jam nut, and sliding a first nipple having a test port onto the tube. The test port can include a test port plug.

A second nipple is then slid onto the tube adjacent the first nipple. A first ferrule is slid into the tube adjacent the second nipple, and the upstream end of the tube is inserted into a female profile such that the first ferrule is adjacent the female profile.

The second nipple is then threadably engaged with the female profile while maintaining the first ferrule between the female profile and the second nipple.

The first nipple is then adjustably, removably, and threadably engaged with the second nipple, forming an adjustable threaded engagement.

The first nipple can then be threadably engaged into the inverted jam nut while maintaining the second ferrule between the inverted jam nut and the first nipple.

The test port plug is then removed and a pressure generating device is connected to the test port. A pressure is applied through the test port, simultaneously forming the primary and secondary seals by compressing the ferrules, as described previously.

The integrity of the seals is evaluated, the pressure is bled, and the test port plug is then reinstalled into the test port.

The present method includes the step of adjusting the adjustable threaded engagement to compensate for slack produced by the pressure. The connector can then be run into the well.

Referring now to FIG. 1, a perspective view of an embodiment of the present high pressure energizable connector is depicted.

Tube 2 is shown inserted into an inverted jam nut 12. Inverted jam nut 12 can be any kind of nut or connector able to be disposed about tube 2 and threadably engaged to adjacent connectors.

Inverted jam nut 12 is shown threadably engaged to a first nipple 6. First nipple 6 has a test port 8 disposed therein. A second nipple 10 is adjustably and threadably engaged with first nipple 6, forming an adjustable threaded engagement 32. Second nipple 10 is depicted threadably engaged with a female profile 4.

Figure 2A:
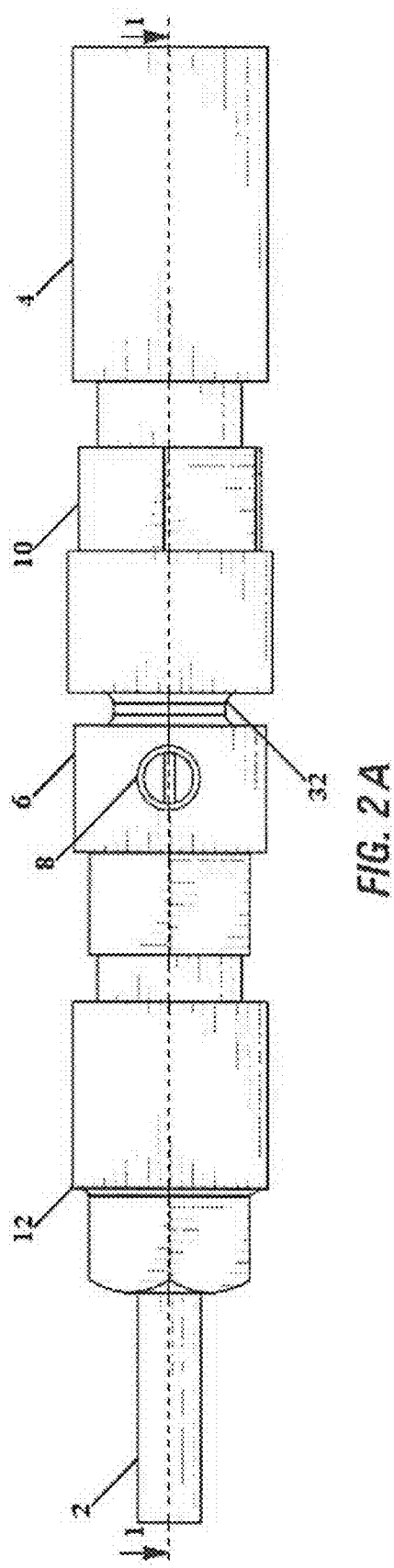
FIG. 2A depicts a side view of the high pressure energizable connector of FIG. 1.

Referring now to FIG. 2A, a side view of the present high pressure energizable connector is depicted.

Tube 2 is shown inserted into inverted jam nut 12. Inverted jam nut 12 is threadably engaged with first nipple 6 having test port 8. First nipple 6 is adjustably and threadably engaged with second nipple 10, forming adjustable threaded engagement 32. Second nipple 10 is threadably engaged with female profile 4.

Figure 2B:
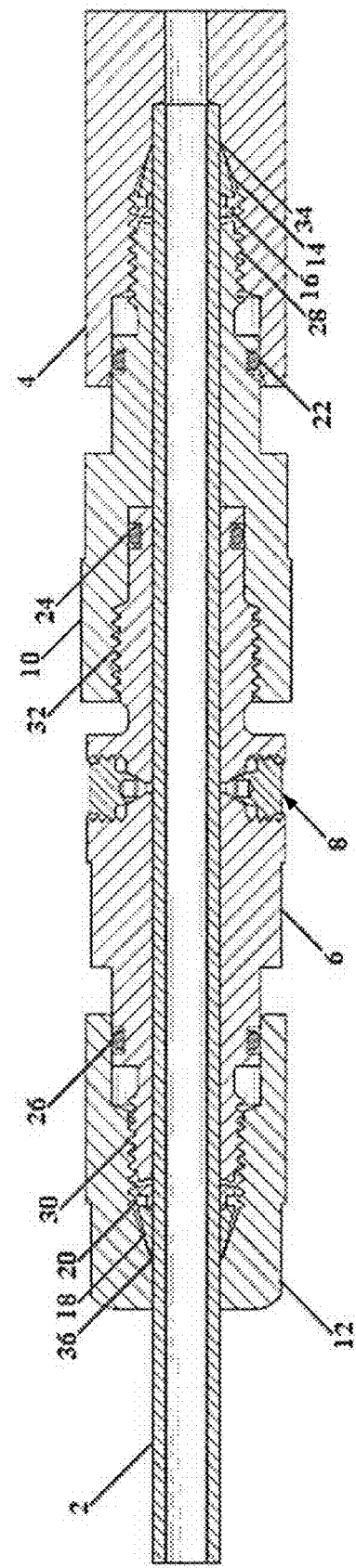
FIG. 2B depicts a cross-sectional view of the high pressure energizable connector of FIG. 2A along line 1-1.
Figure 3:
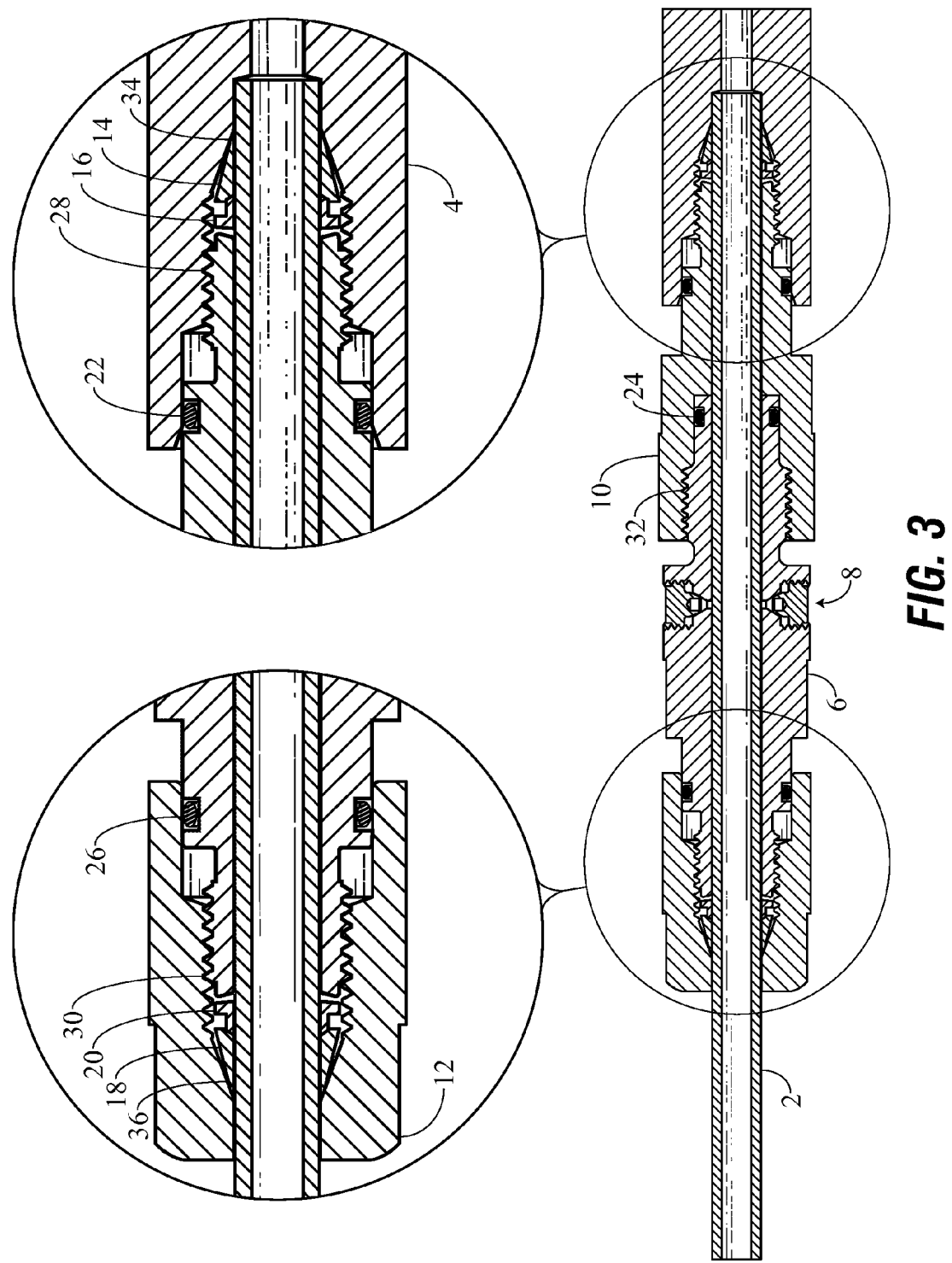
FIG. 3 shows the cross section of the high pressure energizable connector of FIG. 2B along line 1-1 with exploded views showing the details of component connections. The reference numerals of FIG. 3 correspond with those used in FIG. 2B.
Figure 4B:
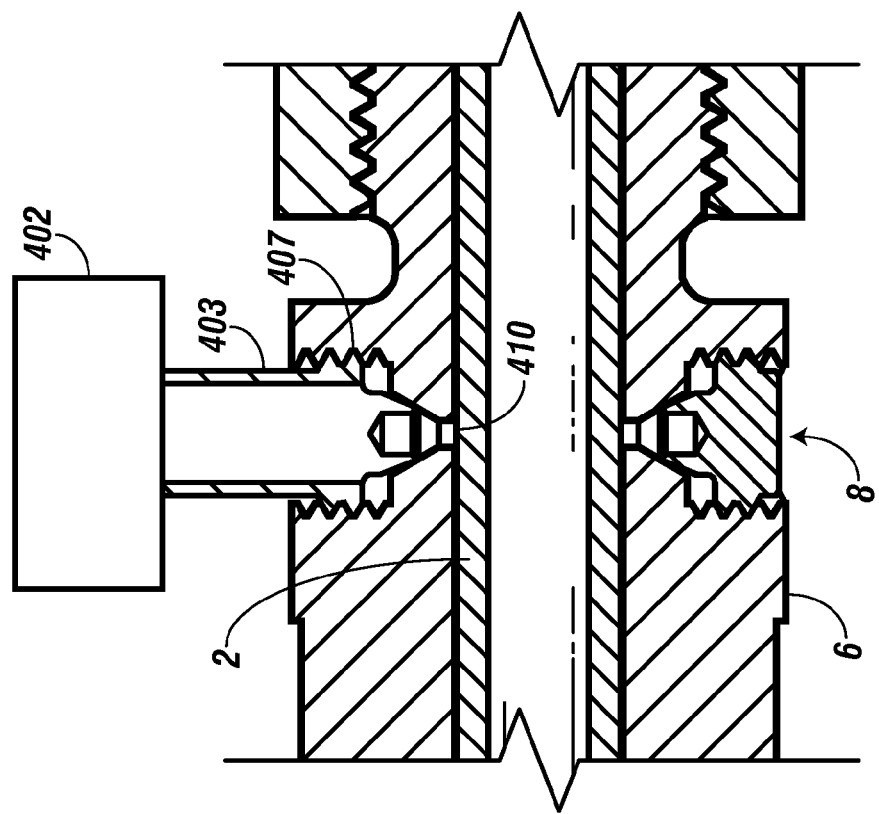
FIG. 4B shows the test port 8 with a threaded engagement 407 forming a sealing engagement 410 between the tube 2 and a test fluid supply 402 through a test fluid supply tube 403.
Figure 4A:
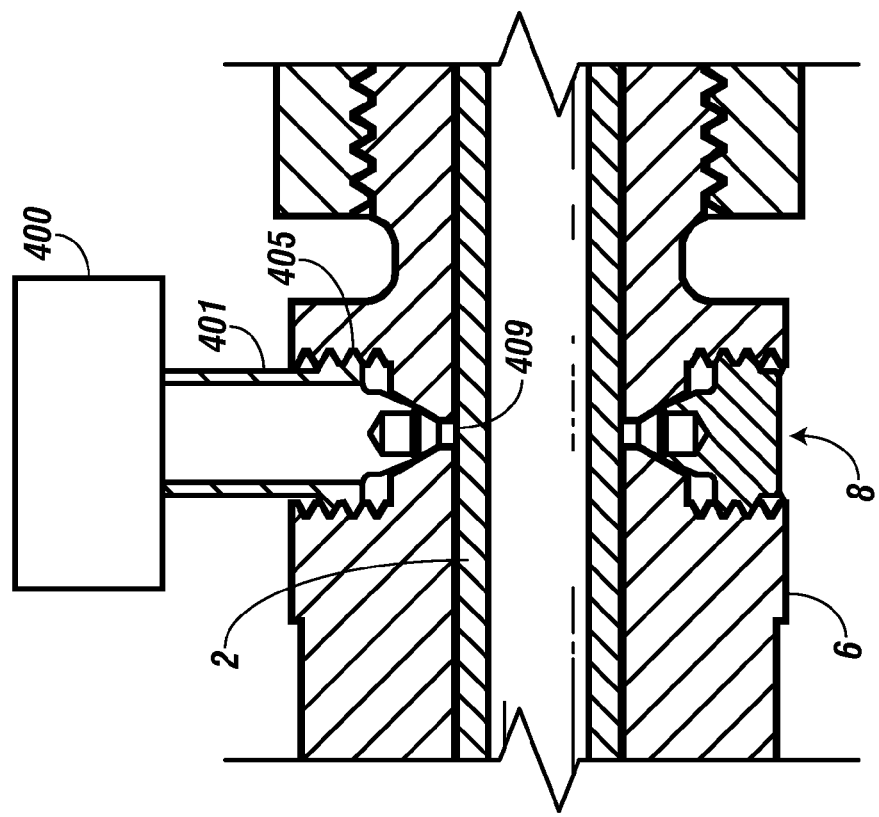
FIG. 4A shows the test port 8 with a threaded engagement 405 forming a sealing engagement 409 between the tube 2 and a pressurized fluid supply 400 through a pressurized fluid supply tube 401.

FIG. 2B depicts a cross section of the high pressure energizable connector of FIG. 2A along line 1-1.

Tube 2 is depicted inserted into inverted jam nut 12. Inverted jam nut 12 is shown threadably engaged with first nipple 6, forming second threaded engagement 30. First nipple 6 has a test port 8.

A second front ferrule 18 and a second rear ferrule 20 are disposed around tube 2 between inverted jam nut 12 and first nipple 6. A secondary seal 36 is formed by compressing second rear ferrule 20 and second front ferrule 18 into inverted jam nut 12 and tube 2 using a pressure applied through test port 8.

First nipple 6 is also shown having a third seal 26, which can be an O-ring or a similar kind of seal, disposed between first nipple 6 and inverted jam nut 12.

First nipple 6 is depicted adjustably and threadably engaged with second nipple 10, forming an adjustable threaded engagement 32. It is contemplated that adjustable threaded engagement 32 can be tightened or loosened as needed to compensate for the slack in tube 2 after applying a pressure through test port 8.

First nipple 6 is shown having a second seal 24, which can be an O-ring or similar kind of seal, disposed between first nipple 6 and second nipple 10. Second nipple 10 is shown having a first seal 22, which can also be an O-ring or a similar kind of seal, disposed between second nipple 10 and a female profile 4.

Female profile 4 is shown disposed about tube 2 and threadably engaged with second nipple 10, forming first threaded engagement 28. A first front ferrule 14 and a first rear ferrule 16 are disposed around tube 2 between second nipple 10 and female profile 4. A primary seal 34 is formed by compressing first rear ferrule 16 and first front ferrule 14 into female profile 4 and tube 2 using a pressure applied through test port 8.

While these embodiments have been described with emphasis on the embodiments, it should be understood that within the scope of the appended claims, the embodiments might be practiced other than as specifically described herein.

What is claimed is:

1. A high pressure energizable tube connector for a well comprising:
   a tube;
   a first connector assembly comprising:
      a female profile disposed over the tube; and
      a ferrule disposed over the tube adjacent the female profile;
   a second connector assembly comprising:
      an inverted jam nut disposed over the tube; and
      a ferrule disposed over the tube adjacent the inverted jam nut, wherein the ferrule extends along the tube in a direction opposite the ferrule of the first connector assembly;
   a nipple comprising a test port, wherein the nipple is disposed over the tube between the ferrule of the first connector assembly and the ferrule of the second connector assembly;

a primary seal formed by compressing the ferrule of the first connector assembly into the female profile using a pressure from the test port;

a secondary seal formed by compressing the ferrule of the second connector assembly into the inverted jam nut using the pressure from the test port; and a second nipple disposed over the tube between the ferrule of the first connector assembly and the nipple, wherein the second nipple adjustably and threadably engages the nipple.

2. The high pressure energizable tube connector of claim 1, wherein the female profile comprises a threaded engagement with the second nipple.

3. The high pressure energizable tube connector of claim 1, wherein the nipple further comprises an inverted jam nut seal, a second nipple seal, or combinations thereof, and the second nipple further comprises a female profile seal.

4. The high pressure energizable tube connector of claim 1, wherein the tube comprises an outer diameter ranging from 1/16 inches to 12 inches.

5. The high pressure energizable tube connector of claim 1, wherein the ferrule of the first connector assembly, the ferrule of the second connector assembly, or combinations thereof comprise a deformable material that deforms upon compression with the pressure.

6. The high pressure energizable tube connector of claim 1, wherein the pressure ranges from one atm to 50,000 psi.

7. The high pressure energizable tube connector of claim 1, wherein the pressure is applied by a hydraulic source.

8. The high pressure energizable tube connector of claim 1, wherein the inverted jam nut comprises a threaded engagement with the nipple.

9. The high pressure energizable tube connector of claim 1, wherein the ferrule of the first connector assembly, the ferrule of the second connector assembly, or combinations thereof comprise a front ferrule and a rear ferrule.

10. The high pressure energizable tube connector of claim 1, wherein the nipple further comprises an inverted jam nut seal.

11. The high pressure energizable tube connector of claim 1, wherein the primary seal comprises a first contact point between the female profile and an outer diameter of the ferrule of the first connector assembly and a second contact point between an inner diameter of the ferrule of the first connector assembly and the tube.

12. The high pressure energizable tube connector of claim 1, wherein the secondary seal comprises a first contact point between the inverted jam nut and an outer diameter of the ferrule of the second connector assembly and a second contact point between an inner diameter of the ferrule of the second connector assembly and the tube.

13. The high pressure energizable tube connector of claim 12, wherein the test port comprises an access hole with a diameter ranging from 1/32 inches to 1/16 inches.

14. The high pressure energizable tube connector of claim 1, wherein the test port:

threadably forms a sealing engagement between the tube and a pressurized fluid supply for forming the primary seal, the secondary seal, and combinations thereof;

threadably forms a sealing engagement between the tube and a test fluid supply during seal testing; or threadably forms a leak tight seal with a plug when testing is complete.

15. The high pressure energizable tube connector of claim 1, wherein the test port further comprises a removable and re-installable test port plug.

\* \* \* \* \*